June 26, 1962 F. C. GUIDA 3,040,462
LUMINESCENT FISH LURE
Filed Nov. 3, 1960
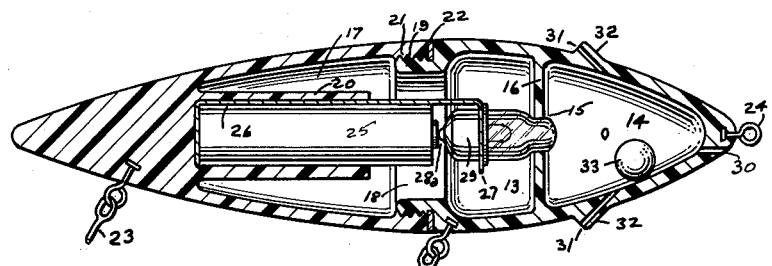
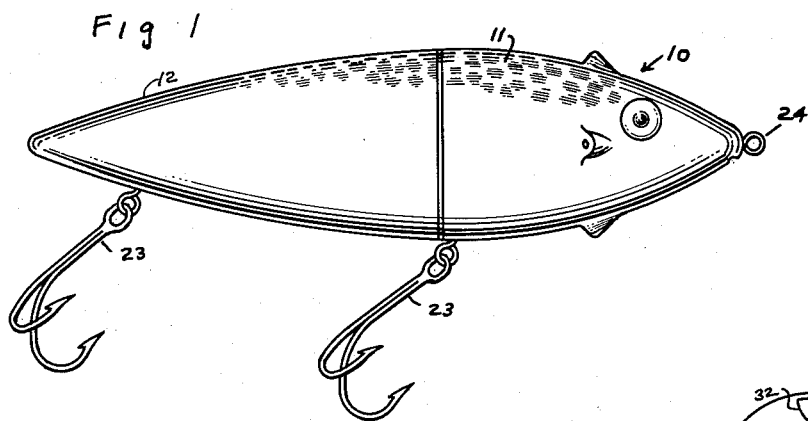
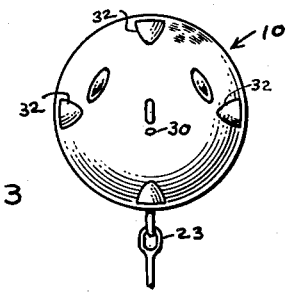
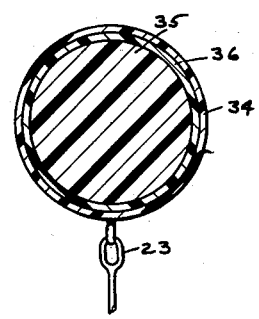
INVENTOR.
FRANK C. GUIDA
BY
Kane, Dalsimer and Kane

3,040,462
LUMINESCENT FISH LURE
Frank C. Guida, 144 Harryel St., Pittsfield, Mass.
Filed Nov. 3, 1960, Ser. No. 66,975
4 Claims. (Cl. 43—17.6)

This invention relates generally to fish lures and more particularly to a fish lure of a luminescent type.

Experiments have shown that certain types of fish and particularly striped bass are attracted to squid which light up. It has further been established by experimentation that the type of fish which is attracted to the squid as a general rule is attracted to other light sources. Having this in mind the subject invention is concerned with a fish lure that can be used in the daylight or in darkness and which will emit a light glow in the water as well as out of it. Such a lure, it has been found, attracts fish of the striped bass type specifically as well as other fish who become curious at the lighting effect.

The invention herein disclosed has as its principal object the furnishing of a luminescent fish lure whose luminous properties will not be affected by immersion in water.

A further object of this invention is to provide a fish lure which gives the impression of a real fish, both as to appearance and sound characteristics.

It is another object of this invention to provide such a luminescent fish lure which can be produced easily and sold inexpensively so that it can be made available to the general public.

A luminescent fish lure and the manner of using the same is described herein with references to the drawings in which:

FIG. 1 is a side view of a fish lure constructed in accordance with the teachings of this invention;

FIG. 2 is a partially sectional longitudinal view of the lure shown in FIG. 1;

FIG. 3 is a front elevational view of the lure shown in FIG. 1; and

FIG. 4 is a fragmentary transverse view of an alternate embodiment of the fish lure shown in FIG. 1.

In FIG. 1 the numeral 10 is used to designate a fish lure constructed in accordance with the teachings of this invention. The lure has a body or outer shell formed or molded in two sections. The front section is designated in the figures by the numeral 11 and the rear section by the numeral 12. These sections are formed with hollow portions therein and with a screw connection so that when they are joined they serve as the body or outer shell of lure 10. As shown in the figures and specifically as shown in FIG. 2, the front section 11 is formed with hollows 13 and 14 therein joined by a small circular opening 15 in wall 16 which serves as a partition supporting the two hollows or chambers. Rear section 12 is formed with chamber 17 therein which is connected to chamber 13 by cylindrical interconnecting chamber 18 formed by threaded male section 19 of front section 11. Cylindrical container 20 is disposed within chamber 17 having one end thereof rigidly connected to the solid portion of section 12 which supports the container in cantilever fashion. Section 12 is formed forwardly thereof with internal threading whereby the threads of portion 19 of the front section may be joined thereto in order to connect front section 11 to rear section 12. O-ring 22 is provided at the connection of the front and rear sections so that it will act as a resilient seal preventing water from entering within the outer shell of the lure when the lure is immersed in water. When front section 11 and rear section 12 are joined the general outline of the body is that of a small fish having its greatest diameter slightly forward of center and being formed with points at either end. The axis of container 20 lies approximately on the longitudinal axis of the lure.

Hooks designated generally by the numeral 23 are rigidly attached to the body of the lure by having an end embedded therein or in any other suitable manner. Additionally, circular hook 24 is fastened to the front or tip end of section 11 whereby the fish lure can be attached to a line.

Cylindrical container 20 supports battery 25 and brass contact member 26 within chamber 17 in such manner that the contact member and the battery project forwardly into chambers 18 and 13. End 27 of contact member 26 is formed perpendicularly thereof and provided to support light bulb 28 with its end 28a poised for contact with battery 25. Passage 15 between chambers 14 and 13 of the front section is of sufficient diameter to receive the bulb therein and to form therewith a watertight valve which prevents flow of water between chambers 13 and 14 when bulb 28 is seated therein. The members of the combination are so dimensioned that upon the joining of the front and back sections 11 and 12 respectively by means of the threads provided for this purpose, the bulb 28 will seat within channel 15 and end 28a of the bulb will be forced into contact with the battery. The contact member being resilient allows for the necessary rearward movement of the bulb so that contact with the battery can be made. Further, the resiliency of the contact member allows the bulb to move out of contact with the battery when the front and rear sections of the lure body are separated. Bulb holder 29 operates with contact member 26 to complete the necessary circuit for lighting of the bulb in the usual manner when bulb end 28a is brought into contact with the battery. Bulb holder 29 may, if desired, be fitted with a pulsating off-on adapter or light blinker.

In this invention the material from which the body is formed is translucent or transparent so that light waves emitted from the bulb can pass through the body of the lure. This material can be a simulated transparent colored plastic or any other suitable material. Further, if it is desired, the portions or sections of the body can be made transparent or translucent while remaining sections can be designed or treated to prevent the passage of light waves therethrough. In the embodiment shown in FIG. 2 a colored transparent plastic is utilized so that upon engagement of the front and rear sections of the lure light waves emitted by bulb 28 can pass through the body of the lure. With the configuration as shown in FIG. 2, the light waves will illuminate chambers 13 and 14 primarily and pass through the body of the lure surrounding these chambers.

Since the lure is designed to be used beneath the surface of the water, openings are provided in chamber 14 to allow water to enter and leave the chamber. Cylindrical opening 30 at the tip of the front section 11 is provided as an intake opening and openings designated generally by the numeral 31 are provided to serve as outlet passages from chamber 14. Openings 31 are formed in the body of section 11 to give the effect of fish gills, such as 32, to further add to the illusion of a real fish. A number of gills can be provided depending upon the wishes of the designer. When the lure is used water can enter chamber 14 through passage 30 and leave through passages 31. This flow of water will weight the front end of the lure so that it can be easily submerged and the change in water density due to the flow of water through passage 30, chamber 14 and outlet 31 past the body of the lure will cause the light being emitted to appear to vary in frequency and/or intensity.

It has been found that many fish are attracted to sounds and in order to take advantage of this known fact cylindrical member 33 is provided within chamber 14 so that it is free to move therein under the force of the water passing therethrrough. The ball can be formed of any suitable material, such as metal, a plastic, or otherwise, and, if it is desired, more than one ball can be used to accomplish the sound.

In FIG. 4 an alternate embodiment of the invention is shown wherein body 34 encloses a core 35 with a luminous coating 36 disposed therebetween. The core can be plastic or any other suitable material and the body 34 should be transparent or translucent. The luminous material 36 can be of any suitable fluorescent or phosphorescent material. In the embodiment shown in FIG. 4 the body can be provided with a chamber such as the chamber 14 as shown in FIG. 2 if it is desired and the chamber can, in turn, be provided with inlet and outlet passages and enclose a ball such as 33 in FIG. 2.

A luminescent fish lure therefore has been provided the use of which it is believed can attract fish which are generally attracted to light emitting bodies and which are generally attracted to sound emitting bodies.

Thus, among others, the several objects in the invention as specifically aforenoted are achieved. Obviously, numerous changes in construction and rearrangement of the parts may be made without departing from the scope of the invention as defined by the claims.

I claim:

1. A fish lure to be totally immersed in water, a chamber formed in said fish lure, a transverse partition within said chamber, a front chamber portion of said chamber provided by said partition, a rear chamber portion of said chamber provided by said partition, there being a bore formed in said fish lure communicating with said front chamber portion and providing an inlet thereto, there being a second bore formed in said fish lure communicating with said front chamber portion and providing an outlet thereof rearwardly of said first bore, a light bulb disposed within said rear chamber portion and a passage formed in said partition through which a portion of said light bulb protrudes to form a water-tight passage therewith.

2. A fish lure in accordance with claim 1 in which the front chamber portion is proportioned with respect to the remainder of the fish lure so that the weight of water passing through said first and second bores will cause the front chamber portion to be weighted.

3. A fish lure in accordance with claim 1 in which a solid spherical member is provided within the front chamber portion and which is moved by water entering and exiting said front chamber through said bores to interfere with the field of the light source.

4. A fish lure in accordance with claim 1 in which the light source is provided with an on-off flasher.

References Cited in the file of this patent
UNITED STATES PATENTS

| | | |
|---|---|---|
| 1,009,968 | Herrmann | Nov. 28, 1911 |
| 1,817,694 | Lafky | Aug. 4, 1931 |
| 1,870,559 | Drake | Aug. 9, 1932 |
| 2,740,220 | Caplan | Apr. 3, 1956 |
| 2,754,610 | Carlson | July 17, 1956 |
| 2,897,623 | Flournoy | Aug. 4, 1959 |